United States Patent Office
3,154,402
Patented Oct. 27, 1964

3,154,402
WAX FORMULATIONS OF THIOLCARBAMATE HERBICIDES
Robert H. Salvesen, Clark, and George A. Weisgerber, Cranford, N.J., assignors to Esso Research and Engineering Company, a corporation of Delaware
No Drawing. Filed Mar. 12, 1962, Ser. No. 179,191
6 Claims. (Cl. 71—2.7)

This invention relates to a thiolcarbamate herbicide in a petroleum wax formulation which is useful for enhanced weed control during preplanting, preemergence, and postemergence of desired crops.

The herbicide-in-wax formulations now described have been found to give these herbicides broader utility and certain advantages, such as use of less of the thiolcarbamate for desired amounts of herbicide action with less crop injury, less need of work for incorporating the herbicide into the soil, and prolonged herbicide action. With prolonged and controlled herbicide action, cultivation of a crop can be delayed until the crop is more mature, thus reducing injury to the crop.

Certain tests have shown that the thiolcarbamate herbicides of interest are effective and rapid-acting weed killers when used in conventional formulations for weed killing before emergence of the crops, but tend to lose weed killing effectiveness rapidly or tend to be injurious to the crop if applied to the soil or present in the soil in concentrations for weed killing after the crops start to grow.

The thiolcarbamate herbicides of interest in general have the following formula:

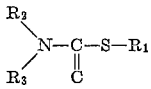

wherein $R_1$, $R_2$ and $R_3$ are alkyl radicals having 2 to 5 carbon atoms. These alkyl radicals may be identical or different. The nature of methods for synthesizing such alkyl-substituted esters of thiolcarbamic acid ic described in U.S. Patents 2,913,324/5/6/7/8, issued November 17, 1959, to H. Tilles et al.

Presently among the most promising of the alkyl-thiolcarbamate herbicides are the following compounds which are given their chemical name and abbreviated name with an indication of the position of the alkyl groups in the general structural formula.

TABLE I

Thiolcarbamate Herbicides

| Chemical Name | Abbreviated Name | Structure |
|---|---|---|
| Ethyl N,N-di-n-propyl thiolcarbamate. | EPP | $R_1$=ethyl. $R_2$=$R_3$=n-propyl. |
| n-Propyl N,N-ethyl-n-butyl thiolcarbamate. | PEB | $R_1$=n-propyl. $R_2$=ethyl. $R_3$=n-butyl. |
| n-Propyl N,N-di-n-propyl thiolcarbamate. | PPP | $R_1$=$R_2$=$R_3$=n-propyl. |
| Butyl N,N-di-n-propyl thiolcarbamate. | BPP | $R_1$=n-butyl. $R_2$=$R_3$=n-propyl. |
| Ethyl N,N-di-n-butyl thiolcarbamate. | EBB | $R_1$=ethyl. $R_2$=$R_3$=n-butyl. |
| n-Propyl N,N-diethyl thiolcarbamate. | PEE | $R_1$=n-propyl. $R_2$=$R_3$=ethyl. |
| Isobutyl N,N-diethyl thiolcarbamate. | IEE | $R_1$=isobutyl. $R_2$=$R_3$=ethyl. |
| n-Amyl N,N-diethyl thiolcarbamate. | AEE | $R_1$=n-amyl. $R_2$=$R_3$=ethyl. |

Some of the above specific compounds have been found acceptable for use on feed crops, e.g., alfalfa, potatoes, beans, safflower, and flax (especially for EPP), and for tomatoes and sugar beets (particularly for PEB). With improved control, these herbicides are indicated to be attractive for use on other crops such as cotton, sugar cane, rice, asparagus, peas, corn, clovers, tobacco, onions, peppers, peanuts, lima beans, spinach, and various others.

The thiolcarbamate herbicides which have gone into commercial production were initially available in two kinds of formulations, one being an emulsified oil concentrate containing about 75% of the thiolcarbamate with 5 to 10% emulsifier and 15 to 20% of a somewhat volatile liquid hydrocarbon such as a heavy naphtha or kerosene, and the other being a granular powder made up of an inert solid material such as clay impregnated with about 5 to 10% of the thiolcarbamate. The oil in the oil concentrate which is emulsified with water may tend to act also as a herbicide when applied, but the oil tends to vaporize. If the oil is not sufficiently volatile and does not evaporate, it may tend to kill the crop seedlings. The herbicide-impregnated granular solid carrier is more persistent than the volatile oil carrier, but tends to have drawbacks in cost of production, separating, handling and distributing. Improvement in weed killing control on using the granular material with lessened crop damage was also found desirable.

In accordance with the present invention, the wax formulations of the thiolcarbamate herbicides are made by heating a crystalline petroleum or paraffin wax, which is composed of paraffinic hydrocarbons and which has a melting point in the range of 122° to 150° F., to a temperature about 10° to 20° F. above the melting point to melt the wax, then admixing with stirring the thiolcarbamate which is compatible with the molten wax and dissolves therein. To the wax-thiolcarbamate solution melt is added a wax-soluble dispersing agent or a dispersing agent which can be solubilized with a solubilizing agent. In using a dispersant which is water-soluble, e.g., morpholine, it is added to the water and a fatty acid, e.g., stearic acid, is added to the molten wax-herbicide solution. The warm wax solution is then added to the water warmed to about the same temperature to form a mixture that has water as the external phase; and this mixture is subjected to homogenizing in a colloid mill or homogenizer which is capable of comminuting the herbicide-containing wax particles to a size of about 0.5 to 100 microns, preferably 0.5 to 10 microns, so as to form on cooling to atmospheric temperatures, a suspension of discrete solid particles in the water. The resulting aqueous concentrate suspension may contain about 0.1 to 10 parts, and preferably 0.2 to 2.0 parts, by weight of wax for each part by weight of the thiolcarbamate herbicide, depending on the control desired. The aqueous dispersion may be made to contain about 30 to 70 wt. percent water. The amount of dispersing agent used may be about 1.0 to 10 wt. percent of the aqueous concentrate. The homogenized aqueous concentrate has a milky appearance.

The paraffin wax may be obtained by well-known commercial methods which generally include congealing of the wax solids in a petroleum fraction and separation of the congealed wax solids from the liquid hydrocarbons as by centrifuging and filtering. The crude wax is treated to lower the oil content as by sweating or by deoiling with solvents. The paraffin waxes include petroleum wax known as slack wax which may contain up to about 35% of oil and refined waxes.

The dispersing agent which may be used for obtaining the suspension of the paraffin wax in water are substances that are known in the art. These include agents known under the tradenames of Span, Tween, morpholine, Triton, and others. These materials include monostearate esters of sorbitan, other esters of polyhydric alcohols, alkylaryl polyethers, and various other surface active type compounds which serve to hold the solid wax particles in suspension. The morpholine water-soluble type dispersing agent was thus used with a fatty acid to form a suspension which may be considered a fast-breaking system due to the high volatility of the morpholine which evaporates after the dispersion is applied to the ground.

The paraffin wax dispersions which were properly prepared and found to be much more effective than oil emulsions carrying the thiolcarbamate herbicides are distinctive in several respects. The dispersed paraffin wax particles containing the herbicide do not form a gel which has a tendency to absorb water. By the gradual addition of the molten wax containing the herbicide to the warm water, there is no phase inversion and the herbicide remains in the wax particles which are dispersed in the water. The dispersion is made homogeneous and stable by use of a colloid mill, and finally the dispersed solid wax particles remain suspended as discrete solid particles.

For the purpose of testing spray applications of the wax suspensions having a thiolcarbamate herbicide dissolved in the wax phase, the following composition was made up:

| | Percent |
|---|---|
| Thiolcarbamate herbicide (equivalent to 1 lb./gal.) | 12.5 |
| Wax (130° F. melting point) (equivalent to 1.6 lbs./gal) | 20.0 |
| Water+dispersing agents | 67.5 |
| | 100.0 |

Typical cutback rates for application to a farm plot in using the wax-herbicide concentrate were 1 to 6 gallons of concentrate to 40 gallons of water. This made the resulting cutback of the concentrate diluted with water contain from 0.3 to 1.9% of the active thiolcarbamate herbicide and 0.5 to 3.0% wax.

The application rate for the cutback or diluted concentrate was in the range of 40 to 100 gallons per acre. This application rate gives a resulting lay-down rate of 1 to 6 pounds of the active herbicide per acre and 1.6 to 9.6 pounds of wax per acre.

Details of the scientific methods used in actual field tests of the herbicide on various crops for evaluating these materials will be described in the following examples. In these tests, formulations of the herbicide in oil emulsions, on dry granular solids, and incorporated in wax suspensoid particles using slow-breaking and fast-breaking emulsifying agents were used. In part of the tests, the oil or wax to herbicide ratio of 6:5 was used, and in others, the ratio of 4:5. The liquid preparations were applied in water using a sprayer delivering 40 gallons per acre. A number of the tests were made with incorporation of the laid-down material into the soil; others were made without doing so. In all the treatments, the comparisons were made with the same rates as expressed in terms of active ingredients per acre. The formulations were applied to randomized plots for proper statistical observation.

EXAMPLE 1

The herbicide, butyl N,N-di-n-propyl thiolcarbamate (BPP), was evaluated for preemergence weed control in growing Thaxter baby Lima beans and Clark soybeans. One wax formulation of the BPP contained 25% of this herbicide, 2.5% Span 60 (sorbitan monostearate), 2.5% Tween 60 (polyethoxy sorbitan monostearate), 0.15% Triton B–1956 (modified phthalic glycerol alkyl), 20% wax and 47.85% water in the concentrate as the slow-breaking suspension. The fast-breaking system contained the same amount of herbicide and wax with 4.0% morpholine, 2% stearic acid, 0.15% Triton B–1956 and 1.0% of Triton X–45 (isooctyl phenyl polyethoxy ethanol).

Examination of the plots about one month after applying the herbicide compositions and planting showed that the wax formulations were four to five times more effective than the standard formulations which did not have the herbicide in fine wax particles. The wax suspension formulations were about ten times as effective against broad-leaved weeds as the other formulations, and about three times more effective against grasses. Although there was somewhat higher early injury to the soybean seedlings, this was later outgrown. Such injury occurred mainly when incorporating the sprayed herbicide into the soil. The test indicated that lower amounts of herbicide could be used with the wax formulations and that incorporation into the soil could be eliminated. The effectiveness of the wax formulations against broad-leaved weeds was outstanding.

EXAMPLE 2

The various formulations of ethyl N,N-di-n-propyl thiolcarbamate were used in tests on strawberries, corn and soybean plots for weed control and crop tolerance. In the corn experiment, the rates of herbicide application were 3 and 5 pounds of active herbicide per acre. Ratings on weed control and crop injury were made periodically. The comparative effects are summarized as follows.

The wax formulations of this herbicide (EPP) effected greater weed control with decreased injury to the strawberry transplants than an oil emulsion of the same herbicide. There was less injury than that imparted by the herbicide on clay granules.

Improved weed control was obtained on the corn plots with substantially no crop injury in using the wax formulation. The wax formulation in which a slow-breaking emulsifier was used gave somewhat better results when incorporated in the soil.

On the soybean crop plot, the wax formulations of the herbicide were as effective as the other formulations for control of broad-leaved weeds after 38 days, and about two to four times as effective after 76 days with somewhat less crop injury.

EXAMPLE 3

Formulations of n-propyl-N,N-ethyl-n-butyl thiolcarbamate (PEB) were tested as in preplanting treatments on spinach at rates of 3 and 5 pounds of herbicide per acre. One formulation was a conventional type with a volatile oil carrier, a second was with a high-boiling naphthenic hydrocarbon oil carrier, and a third was with an aqueous suspension of wax particles containing the herbicide. Plantings of spinach were made 1, 4 and 7 days after herbicidal applications, and observations of the test plots were made 30 and 50 days later. The wax formulation contained the herbicide dissolved in colloidal milled wax particles dispersed in water in the manner described.

The tests showed that planting of the spinach seeds was safe and that better than adequate weed control was obtained, preferably with a longer delay for planting. The wax formulation and a heavy naphthenic oil formulation were better than the standard formulation with more volatile hydrocarbon oil. The naphthenic oil formulation was a selected naphthenic fraction containing hydrocarbons having above 18 carbon atoms per molecule. There was some superiority in crop safety when the wax formulation was used.

In this particular test, there were indications that the low volatility naphthenic (cycloparaffinic) oil could be used with the paraffinic wax in making improved formulations of the PEB herbicide. This naphthenic oil boiled in the range of 300° to 490° F. at 10 mm. pressure.

From a large number of tests such as described with the various thiolcarbamate herbicides, there was substantiation that these herbicides suitably dissolved in the wax and remained in the small solid wax particles dispersed in water to give the desired controlled herbicidal activity with low crop injury. These herbicides evidently are not leached out from the wax particles when homogenized in water containing dispersing agents, such as morpholine-fatty acid combinations or Tritons. The water spray solutions of the wax formulations containing the thiolcarbamate herbicides have been noted to form a thin film on a glass surface of the wax particles having a particle size in the range of about 0.5 to 100 microns, such as obtained in using an Eppenbach colloid mill in dispersing the wax solution of the herbicide in water.

The paraffin wax used in the wax formulation is not in itself significantly herbicidal. Therefore, the wax formulations are surprisingly effective in weed killing power compared to the currently available oil formulations at any interval, before planting or after planting. The wax formulations have the additional advantage of giving greater persistency in weed killing after planting and starting of growth.

While the present invention is particularly concerned with use of the thiolcarbamate herbicides in small solid wax particles, it is to be understood that various other substances may be used together with such wax particles insofar as the substances do not detract from the desired advantages set forth. In using the wax formulations for postemergence control, other herbicides may be added which are compatible with the wax formulations if the particular crops are not adversely affected by such added herbicides. The wax formulations of the herbicides may be used for impregnating various solid fillers which are to be mixed with the soil or which are to be placed on the soil, e.g., sawdust, peat moss, vermiculite, sand, clay, and other granular substances.

It is not intended that this invention be limited to any particular proportions of the ingredients used in formulating the concentrates or spray mixtures, and it is not intended to limit the invention by particular dispersing agents with respect to the broad scope of the invention.

What is claimed is:

1. An organic herbicidal composition free of absorbed water and suitable for stable dispersion in water without phase inversion, said herbicidal composition consisting essentially of solid paraffin wax particles containing dissolved therein 1 part by weight of an alkyl thiolcarbamate as the active herbicidal agent per 0.1 to 10 parts by weight of the wax, said alkyl thiolcarbamate having 2 to 5 carbon atoms in each of three alkyl radicals, and a small amount of wax-soluble dispersing agent for dispersing said particles in water.

2. An organic herbicidal formulation free of absorbed water consisting essentially of paraffin wax particles having dissolved therein an alkyl thiolcarbamate of the formula:

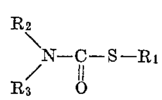

wherein $R_1$, $R_2$, and $R_3$ are alkyl groups containing 2 to 5 carbon atoms, said paraffin wax particles being solid particles of about 0.5 to 100 microns in size, 1 part by weight of the thiolcarbamate being dissolved in 0.1 to 10 parts by weight of the wax, and a wax-soluble dispersing agent dissolved in the wax for dispersing the particles in water.

3. The method of making a wax-herbicide formulation of an alkyl thiolcarbamate having the formula:

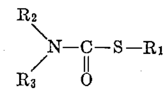

wherein $R_1$, $R_2$, and $R_3$ are alkyl radicals containing 2 to 5 carbon atoms, which comprises dissolving 1 part by weight of the alkyl thiolcarbamate herbicide in 0.1 to 10 parts by weight of paraffin wax warmed to a liquid state, dissolving in the resulting wax solution of the herbicide a small amount of the wax-soluble dispersing agent for dispersing solid particles of the wax solution in water, adding the resulting liquid solution consisting of the herbicide and the dispersing agent in the wax to warm water of about the same temperature to form a dispersion of the wax solution free of absorbed water so that the water remains continuously as the external phase, homogenizing the resulting mixture of the dispersed wax particles having the size of about 0.5 to 100 microns in the water, and cooling the resulting dispersion of said herbicide-containing wax particles in the water to atmospheric temperature.

4. The method as defined in claim 3, wherein the paraffin wax has a melting point in the range of 122° to 150° F. and is warmed to a temperature 10° to 20° F. above its melting point to dissolve in 0.1 to 10 parts by weight of the alkyl thiolcarbamate herbicide and a small amount of the wax-soluble dispersing agent, the resulting wax solution consisting of the paraffin wax, the dissolved alkyl thiolcarbamate and the wax-soluble dispersing agent being dispersed into the warm water to form a dispersion containing 30 to 70 wt. percent of water as the external phase, the wax being maintained free of absorbed water.

5. The method as defined in claim 3, wherein stearic acid is dissolved in the wax as the wax-soluble dispersing agent and water-soluble morpholine is dissolved in the water to which the warmed wax solution is added.

6. The method of controlling weed growth which comprises applying to soil a homogenized aqueous dispersion of solid particles consisting essentially of solid paraffin wax containing dissolved therein a phytotoxic amount of an alkyl thiolcarbamate having the formula:

wherein $R_1$ $R_2$, and $R_3$ are alkyl groups, each containing 2 to 5 carbon atoms per 1 part by weight of said alkyl thiolcarbamate being dissolved in 0.1 to 1 part by weight of the wax and containing a wax-soluble dispersing agent, said wax being maintained free of absorbed water.

References Cited in the file of this patent

UNITED STATES PATENTS

| | | |
|---|---|---|
| 2,248,400 | Avery | July 8, 1941 |
| 2,580,653 | Bridgeman | Jan. 1, 1952 |
| 2,913,327 | Tilles et al. | Nov. 17, 1959 |

FOREIGN PATENTS

| | | |
|---|---|---|
| 612,956 | Canada | Jan. 17, 1961 |